United States Patent
Huymann

(10) Patent No.: US 7,833,421 B2
(45) Date of Patent: Nov. 16, 2010

(54) DEGERMINATION THROUGH CAVITATION

(75) Inventor: Elmar Huymann, Höhenstrasse 5/46, 6020 Innsbruck (AT)

(73) Assignees: Elmar Huymann, Innsbruck (AT); Manfred Lorenz Locher, Munderkingen (DE); Manfred Wagner, Kumhausen (DE)

( * ) Notice: Subject to any disclaimer, the term of this patent is extended or adjusted under 35 U.S.C. 154(b) by 969 days.

(21) Appl. No.: 11/586,187

(22) Filed: Oct. 25, 2006

(65) Prior Publication Data

US 2008/0029462 A1 Feb. 7, 2008

Related U.S. Application Data

(63) Continuation-in-part of application No. 11/499,453, filed on Aug. 4, 2006.

(30) Foreign Application Priority Data

Oct. 25, 2005 (DE) ........................ 10 2005 051 072

(51) Int. Cl.
*C02F 1/32* (2006.01)
(52) U.S. Cl. ..................... 210/748.01; 210/748.02; 422/20
(58) Field of Classification Search ........... 210/748.01, 210/748.02, 748.03; 422/20
See application file for complete search history.

(56) References Cited

U.S. PATENT DOCUMENTS

| 5,810,052 | A | * | 9/1998 | Kozyuk | ................ 138/37 |
| 6,200,486 | B1 | | 3/2001 | Chahine et al. | |
| 6,935,770 | B2 | | 8/2005 | Schueler | |

FOREIGN PATENT DOCUMENTS

| DE | 10009326 A1 | 2/2000 |
| DE | 102 58 898 A1 | 12/2002 |
| DE | 103 10 442 A1 | 9/2004 |
| JP | 2002 001321 | 1/2002 |
| JP | 2005-246198 A | 9/2005 |
| WO | WO0162373 A1 * | 8/2001 |
| WO | WO02/38512 A1 | 5/2002 |

OTHER PUBLICATIONS

Jyoti K K et al: "Effect of Cavitation on Chemical Disinfection Efficiency" Water Research, Elsevier, Amsterdam, NL, Bd. 38, Nr. 9, Mai 2004, Seiten 2248-2257, XP004508314.

* cited by examiner

*Primary Examiner*—Duane Smith
*Assistant Examiner*—Cameron J Allen
(74) *Attorney, Agent, or Firm*—Head, Johnson & Kachigian, P.C.

(57) ABSTRACT

The present application is directed toward a method of destroying microorganisms using a device for treating a medium flowing through the device with a hydrodynamic cavitation field or a super cavitation field for destroying microrganisms contained in the medium.

22 Claims, 4 Drawing Sheets

DEGERMINATION THROUGH CAVITATION

CROSS-REFERENCES TO RELATED APPLICATION

Figure 1:
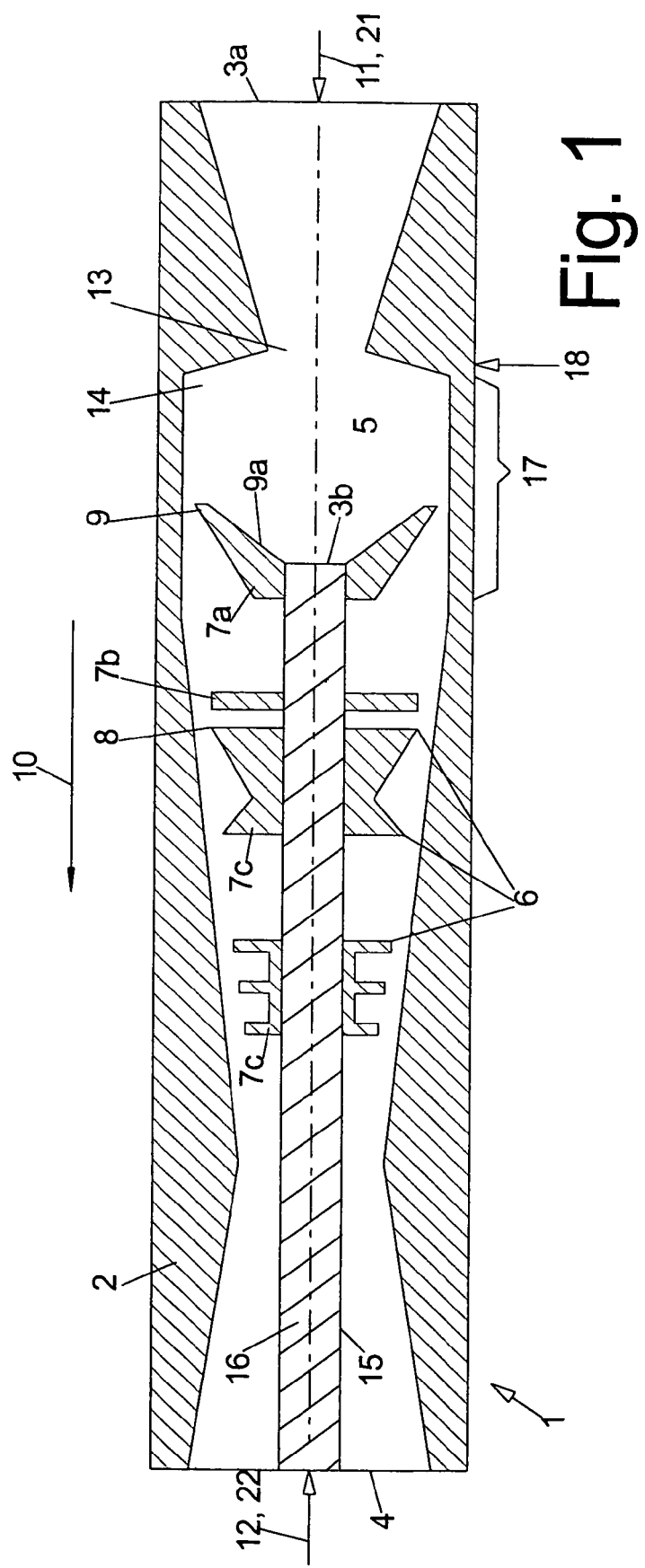

This application is a Continuation-In-Part of U.S. application Ser. No. 11/499,453 filed Aug. 4, 2006 and claims priority to German Application No. 10 2005 051 072.8 filed 25 Oct. 2005.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY REFERENCE OF MATERIAL SUBMITTED ON A COMPACT DISC

Not Applicable

BACKGROUND OF THE INVENTION

1. Field of the Invention

The invention regards a degermination procedure.

2. Description of the Related Art

In particular liquid, at least flow capable media, e.g. water and waste water often are germ infested, thus contaminated with living microorganisms like viruses or bacteria, which have to be removed or at least deactivated.

In a typical degermination situation bacteria are in drinking water or in useable water.

The purification was done so far in various ways, depending on the application and the prevailing conditions:

Chemical killing of the microbes is often performed through adding chemical substances destroying the living microorganisms, e.g. chlorine or ozone in a sufficiently strong concentration.

Thereby one of the problems is, that though the mixing never is complete or 100%, it has to be assured, that at any location in the media a sufficient minimum concentration of the added chemical is present, which often means, that such a high concentration is provided in other locations, thereby causing detrimental effects for the user.

Another customary possibility is the removal of the microorganisms from the medium through a cold procedure, e.g. through filtration. The disadvantage is that such fine filters require a very high manufacturing and maintenance effort, since they clog very quickly without sufficient maintenance and, thereby, become impermeable and unusable.

Another possibility is killing the living microorganisms through heat and/or pressure, however, a very high energy consumption occurs. On the other hand, depending on the medium, through the necessary high temperature or pressure, desired chemical, physical or taste properties of the medium are influenced in a detrimental manner.

On the other hand, the cavitation effect is known and is based on the fact that gas bubbles are created in a rapidly flowing liquid and imploded subsequently. During hydrodynamic cavitation, this occurs through high regional pressure differentials in the flowing liquid, mostly caused through strong variations in the flow velocity due to cross section contractions or expansions.

Also known are ultrasonic cavitation and cavitation through local addition of energy, e.g. through a laser beam.

The generation of hydrodynamic cavitation bubbles occurs in a moving liquid through a drop in static pressure below the vapor pressure of the liquid, forming vapor filled gas bubbles, e.g. due to a flow contraction. Subsequently, when the static pressure increases, again through an expansion of the flow cross section and the static pressure increases again above the vapor pressure, the gas bubbles collapse.

The static pressure becomes zero or negative in water when the flow velocity increases beyond a certain value, depending on the environmental conditions, e.g. at the separation edges approximately 14 m/sec.

The contraction and subsequent expansion of the flow cross section can be accomplished by locating an obstacle body in a flow chamber, wherein the remaining gap e.g. between the obstacle body and the surrounding housing of the flow chamber forms the gap.

Through locating multiple obstacle bodies behind each other, due to space constraints, preferably shaped as discs perpendicular to the flow direction, the cavitation effect is multiplied, in particular, through reducing the annular gap surface in flow direction from one disc to the next.

In addition to the first cavitation field forming in the annular gap area, supplemental cavitation fields are created in the flow-through cavities between the obstacle bodies, and through spatial superposition of the particular cavitation fields a so called super cavitation field is created, causing a multiplication of the cavitation effect of each single cavitation field.

Thereby, it is state of the art to provide the reduction of the area of the annular gap in flow direction through:

a sequence of discs as obstacle bodies, increasing in size in flow direction, forming a cut off cone in their entirety in a surrounding cylindrical housing as flow through chamber, e.g. according to DE 44 33 744, or in an also conical housing as flow through chamber, however with less conicity than the conicity of the cone or cut off cone formed by the obstacles, so that a reduction of the annular gap in flow through direction is still present, e.g. according to EP 1 280 598, wherein a so called hydrodynamic super cavitation field is created.

It is, for example, state of the art to use the cavitation effect created in this manner for mixing a suspension or emulsion with minor effort and without mechanically driven parts.

When the collapse of a large number of bubbles, so called cavitation bubbles occurs in proximity to the separation surface between two phase areas, e.g. large oil droplets in water, thereby the second component, in this case the oil droplets are divided into smaller units and, thereby, a very fine mixture of the two components and a very fine suspension or emulsion are created.

BRIEF SUMMARY OF THE INVENTION

It is an objective of this invention to deactivate microorganisms permanently, in particular living microorganisms in a flow capable medium, in particular a liquid, with comparatively low energy consumption, without negatively influencing the other properties of the medium.

Subsequently a "flow capable medium" is always called a "liquid" without limiting the invention thereto.

The objective is to implode the thus generated cavitation bubbles under a pressure so high that the cellular membranes of the microbes close to the bursting bubble, or also in the bubble, tear open, thereby killing the microbes. Therefore, the pressure differentials occurring at the obstacles have to be strong enough, and preferably the total pressure level of the operation of the cavitator has to be high enough.

Through providing a first obstacle body as an impact plate, thus with an impact surface providing an obstacle in flow direction as strong as possible, wherein the impact surface is flat or even concave towards the first flow component, a partial destruction of the microbes can be accomplished through impact alone.

The impact, therefore, is strongly mixing in particular, since beyond the first obstacle body there is no holder protruding against the flow direction of the first component, since this first and also the subsequent obstacle bodies can be held on a holder shaped as a central axis, protruding from the opposite direction, this means against the flow direction, in the center of the flow chamber.

Since in flow direction, after the entrance opening, first a cross-section contraction, and then a cross section-expansion, both preferably conical, occur. Through the cross-section expansion a vacuum is created in the flow-through chamber in front of the impact plate, which improves the function.

A flow-through gap decreasing in size, measured in main flow direction can, especially in combination with the impact of the first component onto the first obstacle body, be accomplished through the obstacle bodies decreasing in size in main flow direction and thereby also the length of the annular gap around the obstacle bodies, thereby forming a narrowing cone in flow direction.

Thereby, a wall of a surrounding housing can run parallel to the cone of the obstacle bodies, or even have more conicity (larger angle at the tip of the cone), which increases the effect of the decreasing annular surface. But, also a reduced cone shape (smaller angle) at the tip of the housing is possible, slightly reducing the effect through the cone shape of the obstacle bodies.

The effect of the cross-section expansion and of the turbulence is even better when between the cross-section expansion and the impact plate a section with approximately constant cross section of the housing is located in order to stabilize the pressure conditions over the cross section.

The liquid is exhausted through an exhaust opening, flowing out of the housing preferably in a radial manner, in particular shaped as a radial gap.

The efficiency of the device, typically inserted into an existing tubular conduit, can be increased through—e.g. depending on the flow velocity in the in feed tube, the viscosity of the particular components and their mix ability—adjusting the obstacle bodies in a radial manner, the distance amongst each other, and/or in groups, or even in their entirety, relative to the surrounding housing, whereby in a conical housing also the absolute size of the annular gaps is changed.

Furthermore, it is advantageous for the obstacle bodies to be plate-shaped in order to simplify the manufacture and to make them less expensive and, in particular, to make them thin enough so that they can oscillate at their free ends in flow direction, facilitating the generation and separation of vapor bubbles.

Also, this development is facilitated through providing the separation edges of the obstacle bodies, thus e.g. the plates, as sharp as possible.

The flow through gap between the obstacle bodies and the housing can, for example with round obstacle bodies, thus discs, be the radial gap between the free circumferential edge of the discs and the surrounding housing.

However, other embodiments are possible wherein the plate-shaped obstacle bodies at their radial outermost point reach the housing and are connected with it in this location, but e.g. not along the whole circumference, but only in segments, and in the segments between radially extending slots or gaps are provided which can be radially spaced amongst each other and can be spaced from one obstacle body to the next, serving as flow through gaps.

The formation of vapor bubbles and, thereby, the occurrence of cavitation is furthermore facilitated through the length of the separation edges being as long as possible. For this purpose, especially when the obstacle bodies are disc shaped with their circumference forming the separation edge, these can be increased in length through an undulated or serrated shape wherein the non-linear profile can be present when viewing in axial direction, in lateral direction, or in both directions.

If the non-linear, thus undulated or serrated, shape is visible in axial direction, the surrounding housing—seen in axial direction—can be also shaped in an analogous manner so that over the whole circumference a respectively constant cross section between housing and separation edge can be maintained, or the housing is internally round, so that the distances to the separation edge change in circumferential direction.

When the device is additionally provided so that during its operation certain flow conditions are maintained, the cavitation effect is pronounced in particular.

Thus, the cross-section contraction after the intake opening should be sized so that the flow velocity at the tightest location of the cross-section contraction corresponds to the flow velocity in the flow gap of the last obstacle body. Correspondingly, the flow velocity thereafter, at the exhaust after the last obstacle body, should be slightly higher than in the flow gap at the last obstacle body.

A particularly simple embodiment is provided when discs with constant diameter in flow direction are provided as obstacle bodies and the decreasing annular gap is provided through a contraction of the housing in main flow direction. However, this effect is less pronounced than with conically decreasing obstacle bodies, discs in particular.

Advantageous is, furthermore, a strong cross-section contraction behind the intake opening so that from the intake opening to the tightest spot of the cross-section contraction the flow velocity increases by a factor of 9-13, in particular, by a factor of 10-12, in particular, by a factor of 10.5-11.5.

It is, furthermore, advantageous when the obstacle bodies relative to each other and/or to the surrounding housing are positioned and sized so that the flow velocity in the flow-through gap at the last obstacle body in flow direction, compared to the flow through gap at the first obstacle body is increased by a factor of 1.8-2.5, in particular by 2.0-2.3.

The same is true when it is accomplished that the flow velocity from one obstacle body to the next obstacle body in the respective flow-through gap increases by a factor of 1.1-1.4.

As an optimum compromise between simple construction and high efficiency of the device, a number of obstacle bodies between 3 and 10, in particular between 5 and 7, has become apparent. When, with discs made from metal, from stainless steel in particular, the thickness is between 1 mm and 4 mm, in particular between 2 mm and 3 mm, the manufacture is very simple. A cutting plane perpendicular to the main plane of the plates can be used and the plates are still sufficiently elastic.

The axial distance from the middle to the middle of two neighboring obstacle bodies should be between 2 times and 7 times the thickness of the plates, in particular 3 times to 5 times.

The radial width of the annular gap between the exterior circumference of the plate-shaped obstacle bodies and the housing should be between 1 and 5 mm, in particular between 1.5 and 3.8 mm.

Furthermore, an axial length of the section with constant cross section of the housing between the cross-section expansion and the impact plate, of 0.7 to 1.4 times the diameter after the cross-section expansion, thus, of the constant cross-section, has proven advantageous.

Also, the interior free diameter after the cross-section expansion, thus in the section with constant cross section, should be between 0.9 times and 2.0 times, in particular between 0.9 times and 1.1 times the free cross section of the in and/or out flowing conduit.

Preferably, especially the first obstacle body provided as an impact plate, possibly also the second obstacle body, will have a much larger extension in axial direction than the other more plate-shaped obstacle bodies. These first obstacle bodies, which are thicker in axial direction, preferably have a circumferential annular concave indentation along their outer perimeter so that they each have two circumferential annular concave indentation along their outer perimeter so that they each have two annular circumferential, axially spaced separation edges, wherein the indentation should correspond at least to the size of the radial width of the annular gap, preferably be a multiple of this gap.

The separation edges are particularly efficient when they have an acute angle of less than 60°, seen in cross section, in particular less than 50° or even less than 45°, being sharp in particular.

Thereby, preferably, the first separation edge in main flow direction of the first obstacle body should still be in the section of constant interior diameter of the housing, and only the second, as well as all other separation edges should already be located in the axial area of the decreasing interior diameter of the housing.

Overall, the device should be sized and shaped so that over the whole length of the device a pressure drop of at least 2.5 bar, better 4.5 to 5 bar is accomplished.

For availability in longitudinal direction, several obstacle bodies can be put together in a group so they can only be moved in longitudinal direction along the central axis, in particular, in the area of the last obstacle bodies which reduces the complexity of the construction, but only decreases efficiency in a negligible manner.

A process for destroying microorganism contained in a flowable capable medium of the present invention includes the steps of creating gas bubbles and imploding them through hydrodynamic a first component therein in a main flow direction into an intake opening in a cavitator device having a housing, one exhaust opening, a flow through chamber located between the intake opening and the exhaust opening, and a plurality of obstacle bodies with planes perpendicular to the main flow direction being located in the flow through chamber, the cavitator device further having a flow-through gap formed between edges of the obstacle bodies and the surrounding housing wherein the obstacles bodies have sharp separation edges; passing the flow capable medium through a first conical cross-section contraction and into a short conical cross-section expansion thereby creating a vacuum in the flow-through chamber in front of a first obstacle body; feeding in a second component through a hollow conduit having a central axis and an opening therein into the flow-through chamber in a second flow direction facing against main flow direction and in front of first obstacle body; stablizing pressure conditions by forming a constant cross section of the housing between the cross-section expansion and the first obstacle body to increase the effects the cross-section expansion and turbulence; partially destroying the microbes found in the flow capable medium by impacting them against the first obstacle body in the flow direction as strong as possible; continuing cavition of the medium next to a plurality of obstacle bodies located in main flow direction in the housing having decreasing free diameter; and exhausting the component through the exhaust opening.

An alternate embodiment is a method of destroying microorganisms using the device described herein for treating a medium flowing through the device with a hydrodynamic cavitation field or a super cavitation field for destroying microorganisms contained in the medium.

DETAILED DESCRIPTION OF THE DRAWINGS

Embodiments according to the invention are subsequently described in more detail.

FIG. 1 shows the cavitator as a separate component.

FIG. 2 shows the complete device, that is, the cavitator installed in a conduit FIG. 3 shows a longitudinal cut view through a part of the cavitator.

FIG. 4 illustrates a cross section through a part of the cavitator.

FIG. 5 illustrates a cross section through another design of the cavitator.

DETAILED DESCRIPTION OF THE EMBODIMENTS

FIG. 1 shows the cavitator by itself having a conduit as a housing 2, preferably rotationally symmetrical to a main-flow direction 10, shown in FIGS. 1 and 2, flowed through by a first component 21 in main-flow direction 10 from the right to the left.

Thereby, a left, open-front face forms an intake opening 3*a* for the first component 21 flowing into a flow-through chamber 5, hereby initially passing a conical cross-section contraction 13 up to a tight section 18.

Thereafter, comes a substantially faster, thus shorter, cross-section expansion 14 to a free pass through, approximately corresponding to the free pass through at the intake opening 3*a* or slightly larger, but with an expansion section of only ⅕ to 1/10 of the length of the contraction section.

Thereafter, follows a section 17 with constant diameter of the flow-through chamber 5, after which a longer section of conical decrease of the free cross section follows with a subsequent expansion with an equal rate.

Cavitation occurs next to obstacle bodies 7*a,b,c*, located in flow-through chamber 5, the first of which is still in the area of section 17 with constant interior diameter, and the others are located thereafter in main-flow direction 10 in the area of the decreasing free diameter.

The obstacle bodies 7 are located on a central axis 15 protruding from the side of the exit opening 4 in the center of flow-through chamber 5, protruding into it, ending with a first obstacle 7*a*.

With a central axis 15 provided as a hollow conduit 16, it serves as an in feed for a second component 22, thereby being inducted into flow-through chamber 5 in flow direction 12, thus in reverse flow to flow direction 11 of first component 21, originating in the second in feed opening 3*b*, thus in the front face of first obstacle body 7*a* facing against main-flow direction 5.

First obstacle body 7*a*, thereby, serves as an impact plate 9 for first component 21 with an impact surface 9*a*, concave against flow direction II of first component 21 and having a second intake opening 3b for second component 22 at its deepest point.

First obstacle body 7a, shaped as an impact plate 9, has the largest cross section, while the following obstacle bodies 7b and 7c have a correspondingly decreasing cross section, preferably analogous to the decreasing free diameter in flow-through chamber 5 so that the radial width of the annular flow-through gap 6 between the obstacle body and the surrounding housing 2 in flow direction 10 remains constant or decreases.

Obstacle bodies 7a-d shown as examples have several axially spaced circumferentially extending separation edges 8 protruding most against housing 2.

A third obstacle body 7c, seen in a longitudinal cut view, is provided with an annular groove at its outer circumference, confined in axial direction in front and in back by a separation edge 8 having two flat impact surfaces parallel to each other and exactly perpendicular to the axial direction.

Flanges of the annular grooves in the enveloping surfaces of these obstacle bodies transition into these front faces with an acute angle so that separation edges 8 are formed, whose angle at the foremost separation edge, thus at the impact surface 9a, is approximately 45°, and both angles in the separation edges even are below 45°.

Fourth obstacle body 7c consists of several, in this case three, axially spaced and solidly connected radial discs with constant thickness, whose narrow outside enveloping surfaces are parallel to the flow direction 10 and, thereby, perpendicular to the disc plane. A single disc is shown as obstacle body 7b, which will be the preferred shape for obstacles.

Figure 2:
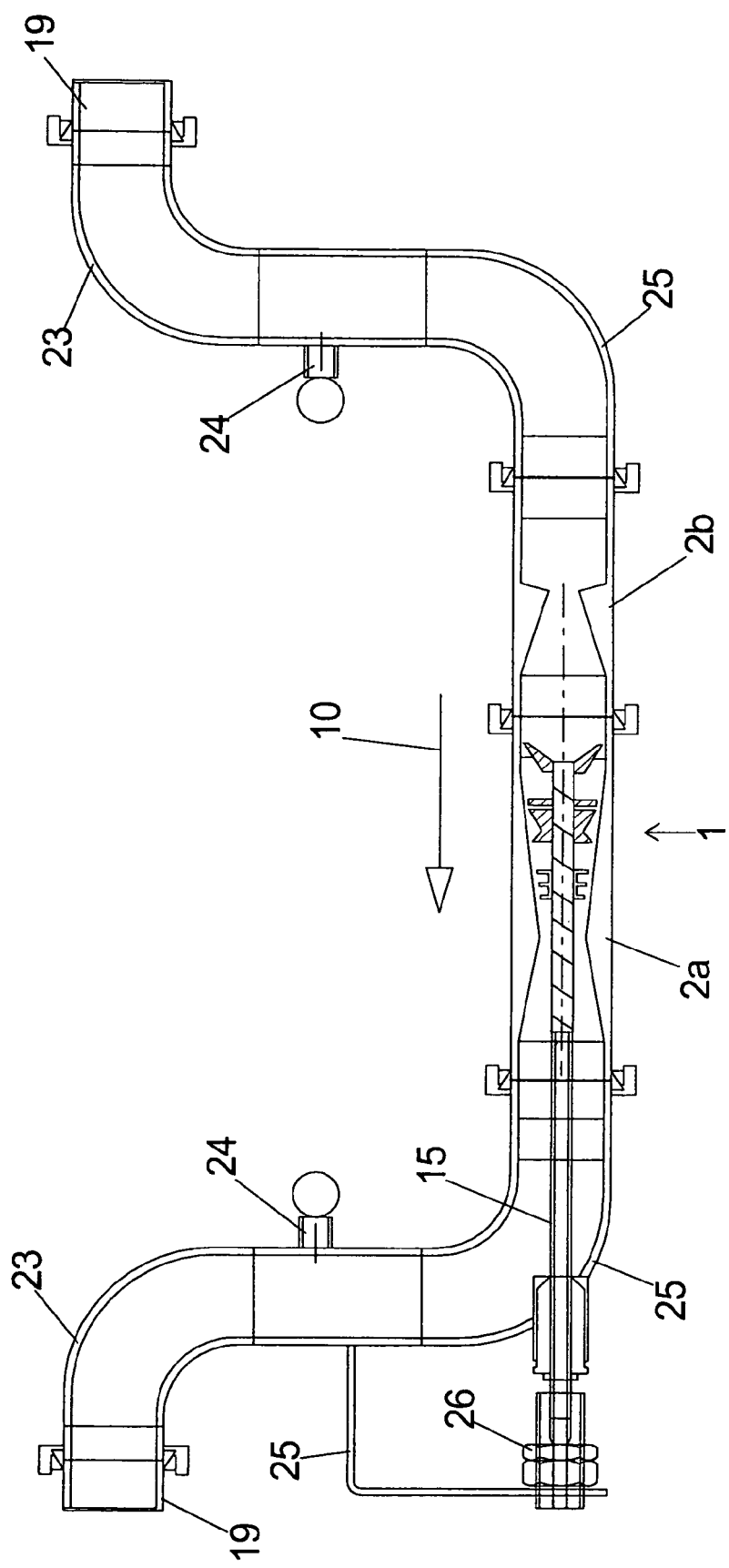

Preferably, obstacle bodies 7a, b, c are separately adjustable along central axis 15. In addition, the whole axis 15 is adjustable in axial direction, as can best be seen from FIG. 2, showing the installation of the mixer 1 into an existing conduit 19.

From conduit 19 initially an angulation and an offset in parallel to the initial extension of the conduit 19 is created through elbows 23, including shut off valves 24, located in the in feed and out flow of mixer 1.

Through the two additional elbows 23', through which a transition is provided into the now parallel offset extension of the conduit 19, the cavitator 1 can be mounted in parallel to the initial extension of conduit 19 between the two elbows 23'.

In this manner, straight central axis 15, which can serve as a conduit 16 for feeding second component 22 at the same time, can be run out through the exterior wall of one elbow 23' and can there be supported relative to a support 23', and can be axially adjusted through a thread and a locking nut 26.

FIG. 2 shows that the free cross-section at intake opening 3a and at exhaust opening 4 corresponds to the free cross-section of the remaining conduit 19, and that housing 2 of the cavitator is provided in two parts, wherein the one part 2a is the housing part where obstacle bodies 7 are located, and the other housing part 2b is the one containing the cross-section contraction in front of the obstacle body and the subsequent cross-section expansion.

Figure 3:
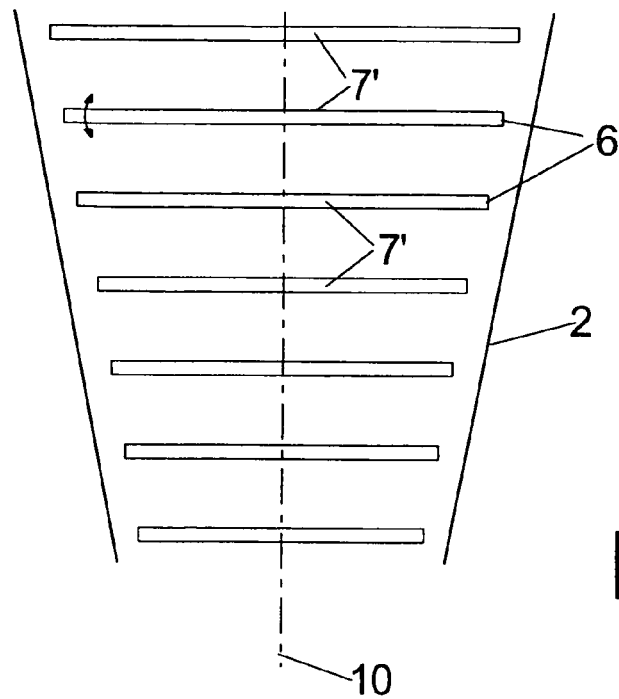

FIG. 3 shows a particular embodiment of obstacle bodies 7 shaped as preferably single, however, at least at their outer perimeter, thin discs 7'. Their thickness relative to their material elasticity is selected so that they can flexibly oscillate in and against flow direction 10, whereby the occurrence of the cavitation effect is accelerated. For this purpose, discs 7' are held in their center, and the discs are possibly provided thinner than the rest at the level of their free circumferential edges.

Figure 4:
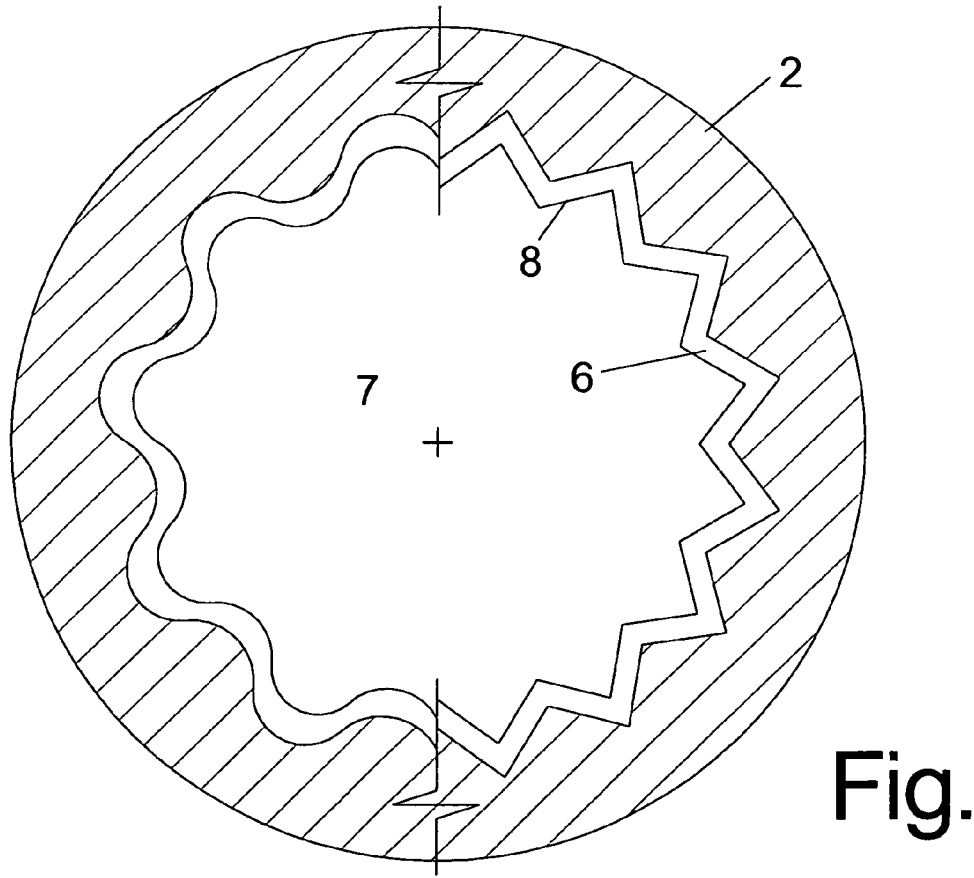
Figure 5:
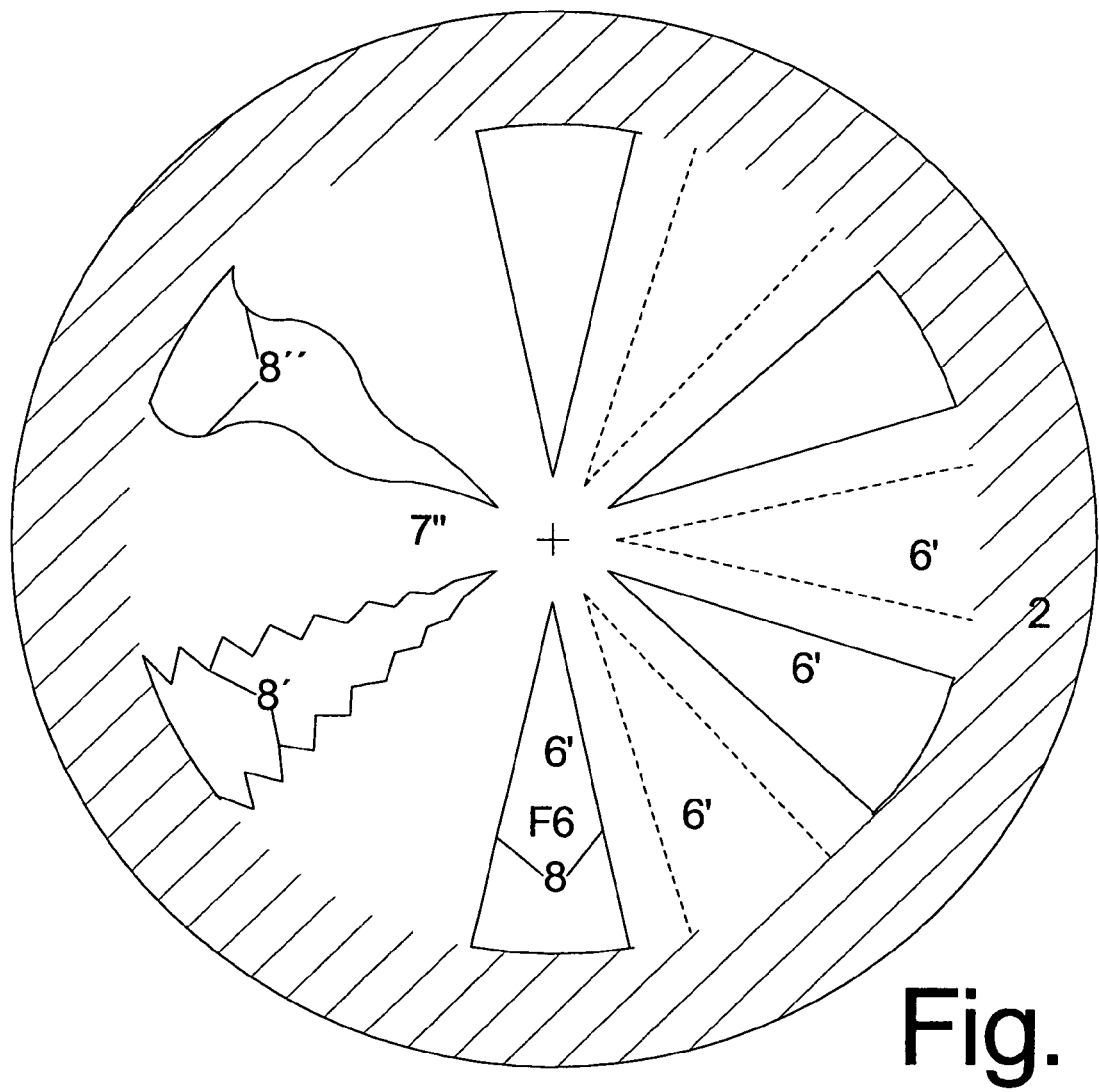

FIGS. 4 and 5 show particular designs of flow-through gap 6.

In FIG. 4, analogous to FIGS. 1 and 2, it is assumed that flow-through gap 6 is an annular gap between the interior obstacle body 7 and housing 2, radially surrounding obstacle body 7 on the outside.

For extending separation edge 8, thus of the circumferential outer edge of obstacle body 7 and thereby for improving the cavitation effect, FIG. 4 shows how an extension can be accomplished, seen in longitudinal direction, through an undulated or serrated shape of separation edge 8. When flow-through gap 6 shall have constant width over its circumference, also the inside contour of housing 2 is shaped analogous.

FIG. 5, on the other hand, shows a solution wherein flow-through gap 6' is not an annular gap between obstacle body 7" and housing 2. To the contrary, obstacle body 7" is partially connected with housing 2 at its outer perimeter, however, obstacle body 7" comprises, from the outer edge towards the inside almost into the center, several approximately radially extending flow-through gaps 6' which, for example, can expand radially from the inside to the outside. These approximately radially extending separation edges 8 can be provided straight and can extend exactly radially or also serrated (separation edge 8') or they also can be provided undulated (separation edge 8").

In order to improve the cavitation, flow-through gaps 6' of the particular obstacle bodies axially arranged behind each other can be offset in circumferential direction, as shown in the right half of FIG. 5.

The surfaces F6 of flow-through gaps 6 can thereby change in flow direction 10 from one obstacle body to the next in a defined manner, e.g. they can be reduced, by making the opening angles of these segment shaped flow through gaps in flow direction smaller and smaller and/or due to the reduction of the interior diameter of the flow-through chamber, thus of housing 2.

What is claimed is:

1. A method of destroying microorganisms, said method comprising the following steps:

using a device for treating a medium flowing through the device with a hydrodynamic cavitation field or a super cavitation field for destroying microorganisms contained in the medium, wherein said device includes a housing (2);

at least one intake opening (3a,b);

one exhaust opening (4) for exhausting;

a flow through chamber (5) between the intake opening (3a,b) and the exhaust opening (4) with a plurality of obstacle bodies having edges (7), located in the flow through chamber (5), having planes perpendicular to a general main flow direction (10); and a flow-through gap (6) between the edges of the obstacle bodies (7) and the surrounding housing (2), wherein the obstacle bodies (7) have sharp separation edges (8), and wherein surfaces of said flow-through gap (6), measured perpendicular to the main flow direction, decrease in the general main flow direction (10), in main flow direction (11), after said at least one intake opening (3a,b) initially a cone-shaped cross-section contraction (13) is provided and subsequently a cone-shaped cross section expansion (14) is provided in front of a first obstacle body (7a), said first obstacle body (7a) provided as an impact plate (9) and wherein said impact plate (9) is concave on an impact side facing against said general main flow direction (10).

2. The method according to claim 1 wherein said device is sized so that it generates a pressure drop over its total length of at least 2.5 bar, better 4.5 to 5 bar.

3. The method according to claim 1 wherein said exhaust opening (4) leads out of said housing (2), arranged in main flow direction, in a radial manner.

4. The method according to claim 1 wherein said obstacle bodies can be adjusted in an axial manner through axial displacement of a central feed line for a second component connected to the obstacle body.

5. The method according to claim 1 wherein said plurality of obstacle bodies (7) can be adjusted relative to each other in an axial manner and can be adjusted relative to a central axis (15).

6. The method according to claim 1 wherein said plurality of obstacle bodies are sized so each can oscillate in the flow direction.

7. The method according to claim 1 wherein said flow-through gap (6) is located between an outer circumference of said plurality of obstacle bodies and the surrounding housing (2).

8. The method according to claim 1 wherein said plurality of obstacle bodies (7) are radially connected with said housing (2) on their outside, providing open segments within their circumference for flow through.

9. The method according to claim 1 wherein said sharp separation edges (8) of said plurality of obstacle bodies (7) have an extension as long as possible and are undulated or serrated, seen either in axial direction, or perpendicular to the axial direction.

10. The method according to claim 1 wherein said obstacle bodies (7') are round discs with a diameter decreasing in general main flow direction (1) with a housing wall always extending in the same radial distance to radial outer edges of the discs.

11. The method according to claim 1 wherein a number of said obstacle bodies (7) is between 3 and 10.

12. The method according to claim 1 wherein an axial thickness of said obstacle bodies is between 1 mm and 4 mm.

13. The method according to claim 1 wherein an axial distance from the middle to the middle of two adjacent obstacle bodies is two times to seven times the thickness of the plates.

14. The method according to claim 1 wherein a radial width between the obstacle bodies (7) and the housing is 1 mm to 5 mm.

15. The method according to claim 1 wherein said separation edges (8), in cross section, have an angle of less than 60°.

16. The method according to claim 1 wherein several obstacle bodies (7) are combined into a group and are only adjustable together along a central axis (15).

17. A method of destroying microorganisms, said method comprising the following steps:
  using a device for treating a medium flowing through the device with a hydrodynamic cavitation field or a super cavitation field for destroying microorganisms contained in the medium, wherein said device includes
  a housing (2);
  at least one intake opening (3a,b);
  one exhaust opening (4) for exhausting;
  a flow through chamber (5) between the intake opening (3a,b) and the exhaust opening (4) with a plurality of obstacle bodies having edges (7), located in the flow through chamber (5), having planes perpendicular to a general main flow direction (10); and
  a flow-through gap (6) between the edges of the obstacle bodies (7) and the surrounding housing (2), wherein the obstacle bodies (7) have sharp separation edges (8), and wherein surfaces of said flow-through gap (6), measured perpendicular to the main flow direction, decrease in the general main flow direction (10),
  in main flow direction (11), after said at least one intake opening (3a,b) initially a cone-shaped cross-section contraction (13) is provided and subsequently a cone-shaped cross section expansion (14) is provided in front of a first obstacle body (7a) wherein said cross-section contraction (13) after intake opening (3a,b) is sized so that a flow velocity at the beginning of the cross-section contraction corresponds to a flow velocity at a last obstacle body (7).

18. A method of destroying microorganisms, said method comprising the following steps:
  using a device for treating a medium flowing through the device with a hydrodynamic cavitation field or a super cavitation field for destroying microorganisms contained in the medium, wherein said device includes
  a housing (2);
  at least one intake opening (3a,b);
  one exhaust opening (4) for exhausting;
  a flow through chamber (5) between the intake opening (3a,b) and the exhaust opening (4) with a plurality of obstacle bodies having edges (7), located in the flow through chamber (5), having planes perpendicular to a general main flow direction (10); and
  a flow-through gap (6) between the edges of the obstacle bodies (7) and the surrounding housing (2), wherein the obstacle bodies (7) have sharp separation edges (8), and wherein surfaces of said flow-through gap (6), measured perpendicular to the main flow direction, decrease in the general main flow direction (10),
  in main flow direction (11), after said at least one intake opening (3a,b) initially a cone-shaped cross-section contraction (13) is provided and subsequently a cone-shaped cross section expansion (14) is provided in front of a first obstacle body (7a), wherein said cross-section contraction (13) after intake opening (3a,b) is sized enough so that a flow velocity (v) increases by a factor of 9 to 13.

19. A method of destroying microorganisms, said method comprising the following steps:
  using a device for treating a medium flowing through the device with a hydrodynamic cavitation field or a super cavitation field for destroying microorganisms contained in the medium, wherein said device includes
  a housing (2);
  at least one intake opening (3a,b);
  one exhaust opening (4) for exhausting;
  a flow through chamber (5) between the intake opening (3a,b) and the exhaust opening (4) with a plurality of obstacle bodies having edges (7), located in the flow through chamber (5), having planes perpendicular to a general main flow direction (10); and
  a flow-through gap (6) between the edges of the obstacle bodies (7) and the surrounding housing (2), wherein the obstacle bodies (7) have sharp separation edges (8),
  wherein said obstacle bodies (7) are positioned and sized relative to each other and/or relative to the surrounding housing (2) so that a flow velocity (v) in said flow-through gap (6) of a last obstacle body, seen in flow direction, is increased relative in the flow-through gap of a first obstacle body by a factor of 1.8 to 2.5.

20. A method of destroying microorganisms, said method comprising the following steps:
  using a device for treating a medium flowing through the device with a hydrodynamic cavitation field or a super cavitation field for destroying microorganisms contained in the medium, wherein said device includes
  a housing (2);
  at least one intake opening (3a,b);
  one exhaust opening (4) for exhausting;
  a flow through chamber (5) between the intake opening (3a,b) and the exhaust opening (4) with a plurality of obstacle bodies having edges (7), located in the flow through chamber (5), having planes perpendicular to a general main flow direction (10); and
  a flow-through gap (6) between the edges of the obstacle bodies (7) and the surrounding housing (2), wherein the obstacle bodies (7) have sharp separation edges (8), and wherein said obstacles bodies are positioned relative to each other and the surrounding housing (2) so that a flow velocity (v) in respective flow-through gap increases from one obstacle body (7) to a next in flow direction (v) by a factor 1.1 to 1.4.

21. A method of destroying microorganisms, said method comprising the following steps:
  using a device for treating a medium flowing through the device with a hydrodynamic cavitation field or a super cavitation field for destroying microorganisms contained in the medium, wherein said device includes
  a housing (2);
  at least one intake opening (3a,b);
  one exhaust opening (4) for exhausting;
  a flow through chamber (5) between the intake opening (3a,b) and the exhaust opening (4) with a plurality of obstacle bodies having edges (7), located in the flow through chamber (5), having planes perpendicular to a general main flow direction (10); and
  a flow-through gap (6) between the edges of the obstacle bodies (7) and the surrounding housing (2), wherein the obstacle bodies (7) have sharp separation edges (8), and wherein at least a first, and possibly a second obstacle body (7) has a much larger axial extension than remaining obstacle bodies (7), including an annular concave indentation on their outer circumference so that they each have two annular circumferential separation edges (8).

22. A method of destroying microorganisms, said method comprising the following steps:
  using a device for treating a medium flowing through the device with a hydrodynamic cavitation field or a super cavitation field for destroying microorganisms contained in the medium, wherein said device includes
  a housing (2);
  at least one intake opening (3a,b);
  one exhaust opening (4) for exhausting;
  a flow through chamber (5) between the intake opening (3a,b) and the exhaust opening (4) with a plurality of obstacle bodies having edges (7), located in the flow through chamber (5), having planes perpendicular to a general main flow direction (10); and
  a flow-through gap (6) between the edges of the obstacle bodies (7) and the surrounding housing (2), wherein the obstacle bodies (7) have sharp separation edges (8), and wherein a first obstacle body (7) with its first separation edge (8) in flow direction is located in an area of constant interior diameter of said housing (2) and a second separation edge (8) is located in an axial section of decreasing interior diameter of said housing (2).

* * * * *